United States Patent [19]

Lee et al.

[11] 3,779,803

[45] Dec. 18, 1973

[54] INFRARED SENSITIVE SEMICONDUCTOR DEVICE AND METHOD OF MANUFACTURE

[75] Inventors: Robert E. Lee, Essex Junction, Vt.; Philip S. McDermott, Athens, Pa.; Edward S. Pan, Poughkeepsie, N.Y.

[73] Assignee: International Business Machines Corporation, Armonk, N.Y.

[22] Filed: Nov. 22, 1971

[21] Appl. No.: 201,224

Related U.S. Application Data

[62] Division of Ser. No. 877,312, Nov. 17, 1969, Pat. No. 3,642,529.

[52] U.S. Cl. ............ 117/211, 117/106 R, 117/201, 117/212, 117/217, 148/174, 252/62.3 R

[51] Int. Cl. ............ H01l 7/36, B44d 1/18

[58] Field of Search ............ 117/106 R, 201, 211, 117/217, 212; 148/174; 252/62.3

[56] References Cited

UNITED STATES PATENTS

| | | | |
|---|---|---|---|
| 3,619,283 | 11/1971 | Carpenter | 117/106 R |
| 3,619,282 | 11/1971 | Manley | 117/201 |
| 3,462,323 | 8/1969 | Groves | 117/106 R |
| 3,514,320 | 5/1970 | Vaughan | 117/106 R |
| 3,480,473 | 11/1969 | Tanos | 117/106 R |
| 3,415,678 | 12/1968 | Gutierrez | 117/106 R |

*Primary Examiner*—Alfred L. Leavitt
*Assistant Examiner*—M. F. Esposito
*Attorney*—John S. Gasper

[57] ABSTRACT

An infrared sensitive photoconductive material is produced by growing a ternary compound of the formulation $Hg_{(1-x)}Cd_xTe$ from a gaseous mixture of mercury, cadmium and tellurium onto a substrate which promotes polycrystalline growth and is chemically inert vis-a-vis the constituent gases. Suitable substrate materials are quartz, sapphire, and certain types of glass which are non-meltable at growth temperatures of the ternary compound. The method preferably grows the polycrystalline material from a gaseous mixture of mercury, cadmium and tellurium heated to a temperature which inhibits binary combinations and then is rapidly cooled to supersaturation very close to the surface of a solid amorphous substrate material although crystalline substrates may be used provided the lattice structure in growth is incompatible with the lattice of the ternary compound.

4 Claims, 4 Drawing Figures

INFRARED SENSITIVE SEMICONDUCTOR DEVICE AND METHOD OF MANUFACTURE

CROSS-REFERENCES TO RELATED APPLICATIONS

This is a division, of application Ser. No. 877,312 filed Nov. 17, 1969 now U.S. Pat. No. 3,619,282.

This application is related to U.S. Pat. Application of G. W. Manley et al., Ser. No. 763,147, filed Sept. 27, 1968, now U.S. Pat. No. 3,619,282 entitled, "Method and Apparatus For Vapor Growing Ternary Compounds"; and U.S. Pat. Application of D. R. Carpenter et al., Ser. No. 763,307, filed Sept. 27, 1968, now U.S. Pat. No. 3,619,283 entitled, "Method and Apparatus for Epitaxially Growing Thin Films."

BACKGROUND OF THE INVENTION

1. Field of the Invention

This invention relates to semiconductor devices in the forms of ternary compounds and particularly to a ternary semiconductor material which is infrared sensitive and its method of production.

2. Description of the Prior Art

It is well known in the prior art to produce ternary compounds from the II-VI valence groups which are infrared sensitive. Heretofore it was long thought that such materials to be radiation sensitive in the IR range and to operate satisfactorily as semiconductor IR detector devices would have to be monocrystalline in structure. The use and manufacture of the monocrystalline sensor material presented substantial problems. For epitaxially produced material, for example, the growth substrate has to be carefully selected so that its lattice structure at the growth temperature of the compound was compatible with the lattice of the grown film. This narrowed the choice to one material in most cases and presented other limitations on using variation in temperature as a technique for controlling constituent formulations of the compound. Further, the growth size of the monocrystals tended to be limited because of limited substrate size and shape.

SUMMARY OF THE INVENTION

The broad object of the present invention is to provide an improved sensor device and method of manufacture.

It is a specific object to provide a sensor device and process of manufacture which overcomes the above-mentioned limitations associated with monocrystalline sensor materials.

In accordance with this invention, an infrared detector device is provided in which polycrystalline material is used. It was discovered that polycrystalline ternary compounds having the formulation $Hg_{(1-x)}$ $Cd_xTe$ where $x$ is greater than zero and less than one is infrared sensitive. It was further discovered that devices using such material can be made which approach the theoretical limit of sensitivity for specified wavelengths. In the preferred embodiment, the invention is practiced by growing a ternary compound of mercury, cadmium, telluride from a gaseous mixture of mercury, cadmium, tellurium by rapidly cooling to supersaturation for growth onto a solid substrate which, in general, promotes polycrystalline growth. Specifically, the gaseous mixture is supersaturated and grown on an amorphous substrate such as quartz or a glass which will remain solid and is inert relative to the reactant gases. A particular glass is a heat resistant glass of the type sold commercially under the trade name of Vycor. Polycrystalline materials have also been grown on single crystal quartz, sapphire ($Al_2O_3$), and alumina. Other materials may also be used for the substrate which satisfy the general criteria.

It will be seen from this discovery that greater freedom of choice is obtained in the selection of a growth substrate. Because of the greater ability to deposit on a greater variety of substates it becomes more readily possible to integrate infrared sensor material with other semiconductor materials to provide monolithic detector structures. Growth over a wider surface area becomes possible within the limits of the growth equipment thereby producing a greater yield in the production of the sensor material. Further, sensor devices using polycrystalline mercury, cadmium, telluride compounds have shown good high frequency response characteristics.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
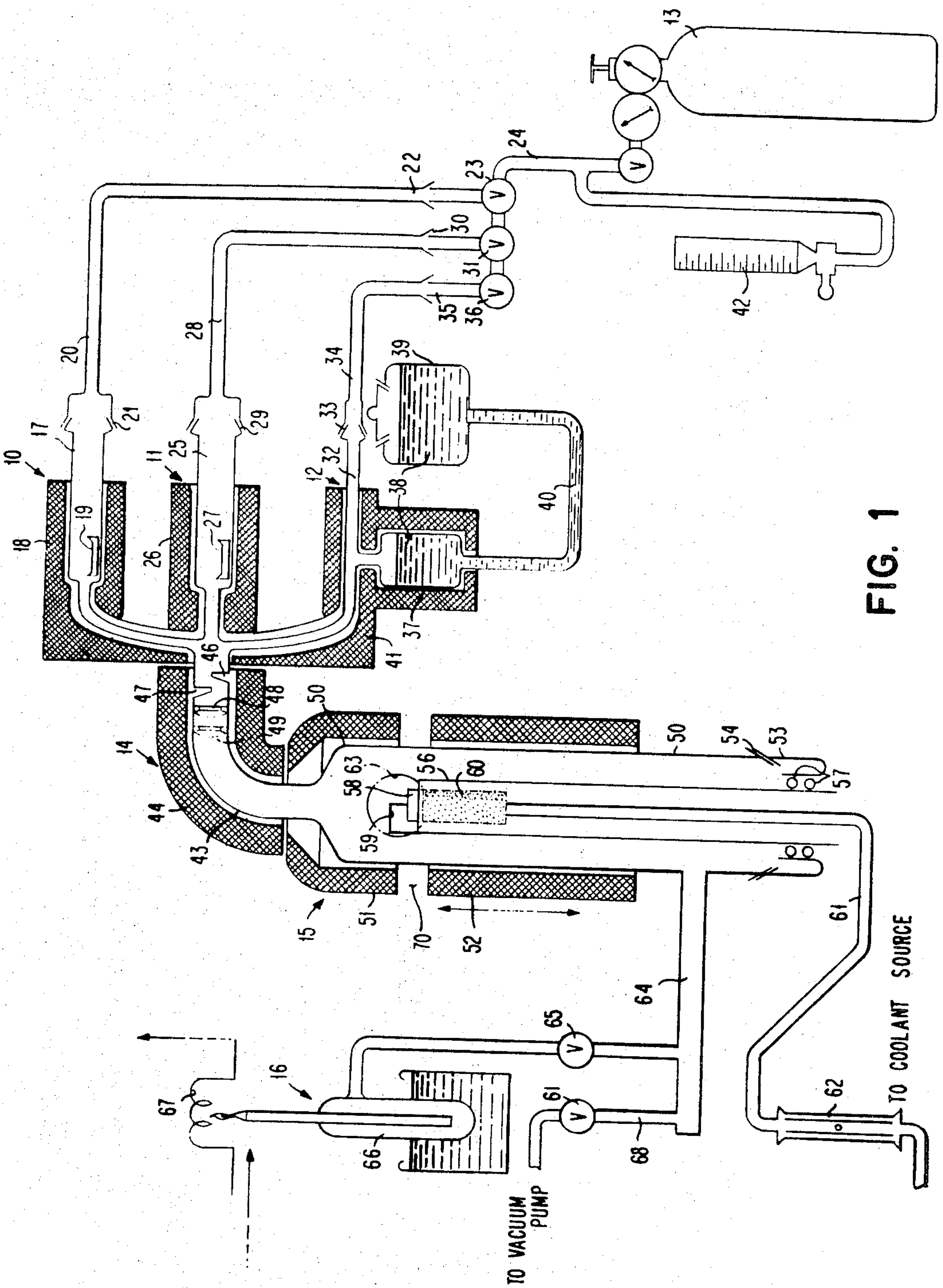
FIG. 1 is a cross-sectional view and schematic of an apparatus useful for practicing the present invention.

Referring to FIG. 1, a vapor growing apparatus for practicing this invention comprises source furnaces 10, 11, and 12 connected in parallel between a source 13 of an inert carrier gas and a mixing furnace 14, which in turn is connected to a reaction furnace 15 connected to apparatus 16 for venting the inert gas to the atmosphere. Source furnace 10 comprises a quartz chamber 17 wound with a heating coil 18. A supply of elemental cadmium 19, preferably in the form of pellets in a quartz boat, is located within the heating zone established by coil 18. A current supply and regulating means of suitable type (not shown) which is independently operable, is connected to heating coil 18 to maintain temperature levels to effect volatilizing of the elemental cadmium into the hydrogen gas stream as it flows through chamber 17. The channel for supplying hydrogen gas to chamber 17 comprises tube 20 connected to chamber 17 via airtight seal 21, and through flow meter 22 and flow valve 23 to a common flow line 24.

Source furnace 11 comprises a quartz chamber 25 wound with heating coil 26 electrically connected and controlled in essentially the same manner as coil 18 of furnace 10. A supply 27 of elemental tellurium, preferably in pellet form in a quartz boat, or the like, is located within the heating zone of coil 26 to be volatilized and added to a hydrogen gas stream flowing through chamber 25. The carrier gas channel to furnace 11 comprises a tube 28 connected by an airtight seal 29 to chamber 25 and through the flow meter 30 and flow valve 31 to supply line 24.

Source furnace 12 comprises a T-shaped quartz tube 32 having one branch connected by an airtight seal 33 to the tube 34 flow meter 35 and valve 36 to supply line 24. The second branch of chamber 32 is connected to a mercury supply well 37. Liquid mercury 38 is fed gravity from an external reservoir 39 through connecting tube 40 to well 37. An electrical coil 41 which is wound entirely around the well 37 as well as the entire junction area of tube 32 is electrically connected to a current source and regulating means of a suitable type for vaporizing the mercury at predetermined temperature and pressure levels for addition to a hydrogen gas stream flowing through the tube 32. The connection of tube 32 to well 37 is preferably made long and the winding of coil 41 is such as to allow a measure of preheating of the mercury vapors prior to their addition to the hydrogen gas stream in tube 32. The flow of hydrogen gas from source 13 is suitably measured for regulation means such as bubble column 42, or the like, connected to supply line 24.

As shown, the mixing furnace 14 comprises a cylindrical quartz chamber 43 entirely wound with a heating coil 44 which is electrically connected to suitable current source and regulating means (not shown) which may be independently operable to maintain temperature of the mixing chamber 43 at levels to assure proper constituent control. The constitutuent gases mixed with the hydrogen carrier flow from furnaces 10, 11, and 12 into chamber 43 where mixing is produced by a series of baffles 46–49. Further details of construction of the mixing furnace chamber 43 may be understood by reference to the Manley et al application mentioned supra.

The reaction furnace 15 comprises a cylindrical quartz reaction chamber 50, a pair of coaxial heating coils 51 and 52 wound thereon, and a means for supporting a growth substrate 58 at a selectable growth site position within the chamber relative to the heating coils. The reaction chamber 50 is preferably designed with a removable cylindrical section 53 which is provided with a central opening and joins with the rest of the reaction chamber at airtight seal 54. The substrate support comprises a cylindrical pedestal tube 56 which is inserted through the central opening of bottom section 53. Sealing means, such as O-rings 56, are provided between pedestal tube 56 and chamber section 53. A growth substrate 58 is attached by suitable means such as spring clip 59. Cooling means comprises a silver heat sink cylinder 60 inserted within pedestal tube 56, and tube 61, connected through flow meter 62 to an air coolant source. Both the heat sink 60 and spring clip 59 structures may be other than the type shown in the above-mentioned copending application. A viewing port 63 is provided in reaction chamber 50 in the general area of the desired growth site. Venting of the carrier gas from the system is provided by tube 64 connected through valve 65 to a cold trap 66. If the carrier gas is to be burned when vented, as in the case where hydrogen gas is used, an ignition device, such as coil 67, may be used. The system is also connected to a vacuum pump from tube 64 through tube 68 and valve 69.

As discussed in greater detail in said Manley et al. application, the heating coils 51 and 52 are connected to separate current source and regulator means, and are relatively movable longitudinally along reaction chamber 50 to provide gap 70 as a means of regulating thermal gradients.

The method for operating the apparatus of FIG. 1 is explained in substantial detail in the said Manley et al application. Generally, the same procedures are followed in practicing this invention. However, the distinguishing feature of the present invention involves the use of substrates 58 which cause the growth of polycrystalline, mercury, cadmium, telluride. In general, a class of substances used in practicing the present invention comprises a solid material which is amorphous or which has a lattice structure at the growth temperature which promotes the growth of dendrites or crystalite and which will remain chemically inert, i.e., constituents of the substrate will not react with the growth constituents to change the basic ternary compound composition, nor act as an impurity. The class of materials capable of meeting these general requirements is considered to be quite large however, specific materials successfully used were sapphire ($Al_2O_3$), quartz, high temperature glass such as Vycor and fine grained polycrystalline alumina. Other substances could also be used provided they remain solid at the growth temperature. A further desirable condition for certain uses of the sensor is that the substrate be a non-conductive material although suitable conductive or semiconductive materials might be useful.

As a preliminary to the growth of the polycrystalline HgCdTe, a substrate is first precleaned in a vapor degreaser and acid etched.

In a specific example, a sapphire disk, approximately 1 cm in diameter and 20 mils thick was selected, degreased in an ultrasonic cleaner and submerged in a potassium dichromate acid solution for several minutes. The size and thickness of the substrate is open to choice and depends to some extent on the size and temperature capabilities of growth equipment. The thickness, for example, depends on the thermal conductivity properties of the substrate material, it being important in using the growth apparatus of FIG. 1 that the cold finger and pedestal be capable of reducing the temperature of the substrate on its growth surface to the temperature required to promote polycrystalline ternary compound formation. Prior to insertion of the sapphire substrate into the growth chamber, the pedestal 56 and growth chamber 50 were cleaned from products of previous runs. The apparatus is then started up as described in the said Manley et al. application, except that the back-etching operation is eliminated. Briefly, the procedure involves placing source materials in furnaces 10, 11, and 12, sealing the system, evacuating the system through valve 69, and then introducing hydrogen (or other inert carrier) gases from source 13 and vented through the apparatus to the atmosphere and ignited by coil 16. Vacuum pump is then stopped and valve 69 closed. Furnaces 10, 12, 14, and 15 are turned on and gradually brought up to a desired temperature level. Initially Cd and Hg enriched streams will flow through furnace 14. Growth will not occur, however, and mercury and cadmium will condense in the lower portion of chamber 50. Lastly, the source furnace 11 is turned on to volatilize tellurium from source 27 into hydrogen gas stream flowing in chamber 25. At the same time, cooling air is supplied to heat sink 60 to drop the temperature of the sapphire substrate 58 to the desired film growing level. In a specific run using a sapphire substrate, a hydrogen flow rate of 60 cc/minute was used and the following operating conditions were set:

Source Furnace Temperature 10 (Cadmium — 370°C
Source Furnace Temperature 11 (Tellurium) — 515°C
Source Furnace Temperature 12 (Mercury) — 280°C
Mixing Furnace Temperature 14 — 850°C
Reaction Furnace Temperature 15 — 800°C
Heat Sink Temperature — 605°C With the above operating conditions, after a period of approximately 2 hours, a polycrystalline material was produced on the surface of the sapphire substrate 58. At the completion of the run, the source furnaces 10 and 11 and the mixing and reaction furnaces 14 and 15 are turned off. The source furnace 12 was kept on after the other furnaces were turned off to allow mercury vapor pressure to remain within prescribed levels in chamber 50 to prevent mercury from being volatilized from the growth material after the heat sink 60 is cut off. Source furnace 12 continues to operate until reaction chamber 50 reaches a temperature of 100°C for HgCdTe and then shut off and opened to the atmosphere.

When inspected, the growth material was observed to have dendritic characteristics with a random distribution over substantially the entire growth area. X-ray analysis of the growth material revealed the following percentages of X-ray counts of the constituent elements:

Mercury — 92.01
Cadmium — 2.41
Tellurium — 5.61

Sensors built with the above-described growth material showed a wavelength sensitivity of 11 micron with a D-Star (500°K, 1000 cps) rating of $10^9$.

Figure 2:
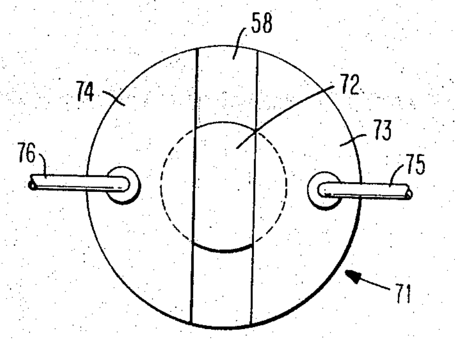
FIG. 2 is a plan view of a sensor device of the present invention.
Figure 3:
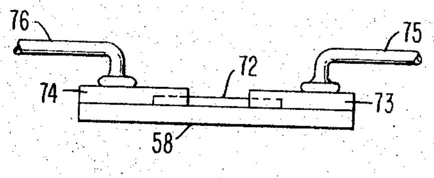
FIG. 3 is a side elevation of the sensor device of FIG. 2.

A sensor element 71 using the polycrystalline growth, as shown in FIGS. 2 and 3, comprises the growth substrate 58, the polycrystalline layer 72, and a pair of spaced thin film electrodes 73 and 74. Wire leads 75 and 76 are bonded to the film electrodes 73 and 74 to permit electrical connection to external circuitry. The method for applying the gold film electrodes 73 and 74 comprised masking a strip of the polycrystalline layer 72 using an inert wire or ribbon such as a nickel-chrome wire, then evaporating gold film onto the unmasked areas. The mask was then physically removed to expose the masked region. Following this, 1 mil gold wires 75 and 76 were bonded to the film electrodes 73 and 74 by means of indium solder and a silver conducting epoxy. Other masking and bonding techniques could be employed and would readily occur to persons skilled in the art.

As previously stated, the substrate 58 is sapphire, quartz (mono - or polycrystalline) alumina, or Vycor. Since sapphire, quartz or Vycor are transparent to IR radiation, the sensor device 71 can be used in applications where layer 72 is exposed either directly to infrared radiation or indirectly through substrate 58. Devices of the type shown in FIGS. 2 and 3 were produced having properties described in the previous examples and Table and in addition have demonstrated response characteristics of 3 nanoseconds.

Figure 4:
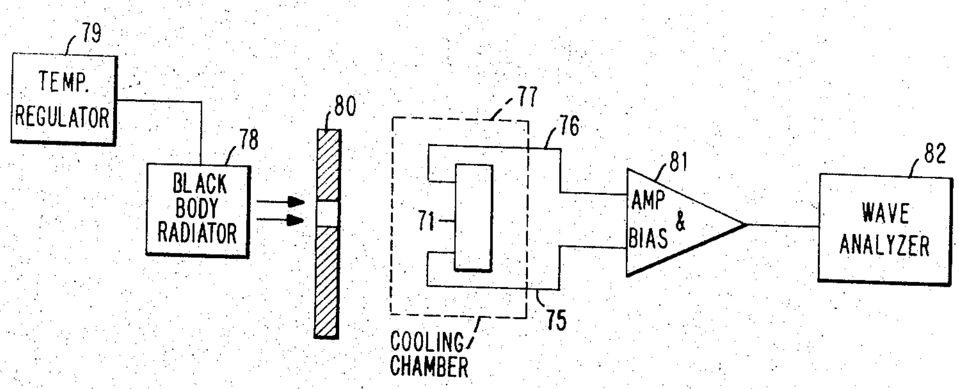
FIG. 4 is a schematic of a sensor device in combination with an electrical circuit device for sensing infrared radiation.

The apparatus for testing is shown in FIG. 4. In one type of test, the sensor device is placed in a cooling chamber 77, using liquid nitrogen as a coolant, and placed proximate a black body radiator 78 source having a temperature set precisely by temperature regulator 79 at 500°K. A radiation chopper, such as a rotating apertured disk 80, is operated at a chopping rate of 500 and 1,000 cps. The sensor device has its leads 74 & 75 connected to a amplifier and biasing circuit 81 having an output to a wave analyzer 82. Amplification and bias circuit 81 and the wave analyzer 82 are well known. In specific tests, the amplifier and bias circuits 81 used was a Perry Mod 600 pre-amp and the wave analyzer was a HP 302A wave analyzer. Using the test setup shown broadly in FIG. 4, the wavelength at a chopping rate of from 13 to 250 cps measured 11 microns peak response while D-Star measured $10^9$. The test apparatus shown is for D-star measurement. For wavelength measurement, a monochrometer device, or the like, (not shown) is interposed between the chopper disk 80 and detector 71. In using the monochrometer it may become necessary to increase the temperature of the black body to compensate for energy losses in the monochrometer.

Other examples of samples and process conditions, as well as results, are set forth in the following Table:

TABLE I

| Sample Number | Substrate | Source Furnace Temp. °C Hg | Cd | Te | Mixing Furnace Temp. °C |
|---|---|---|---|---|---|
| CK105 | Sapphire | 280 | 370 | 515 | 850 |
| CK83 | Sapphire | 300 | 370 | 515 | 850 |
| CK93 | Sapphire | 280 | 370 | 515 | 850 |
| CK80 | Sapphire | 285 | 370 | 515 | 850 |
| CK55 | Quartz (Amorph.) | 270 | 370 | 515 | 950 |
| CK111 | Alumina | 280 | 370 | 515 | 850 |
| CK61 | Vycor | 280 | 370 | 515 | 850 |

TABLE I—continued

| Heat Sink Temp. °C. | Reaction Furnace Temp. °C. | Analysis % X-Ray Fluorescence Counts Hg | Cd | Te | Wavelength microns | D-Star |
|---|---|---|---|---|---|---|
| 603 | 800 | 91.6 | 2.6 | 5.8 | 11 | $10^8$ |
| 590 | 800 | 92.6 | 3.0 | 4.4 | 10 | $10^9$ |
| 615 | 800 | 91.7 | 2.9 | 5.4 | 10 | $10^8$ |
| 590 | 800 | 91.4 | 3.8 | 4.7 | 6 | $10^9$ |
| 585 | 800 | 89. | 5.4 | 5.6 | 8 | $10^7$ |
| 600 | 800 | 97.8 | 1.5 | 5.7 | 12 | $10^6$ |
| 583 | 800 | 88.8 | 5.9 | 5.3 | 8 | $10^7$ |

In the above samples, the substrates dimensions were within the range of 1–2 cm. diameter and 20–40 mils thickness. Growth times were nominally 2 hours with a 6 cc/minute flow rate through each of the source furnaces 10, 11, and 12. The polycrystalline films were produced in sizes from 1 to 2 square centimeters.

While the above examples show growth process using a specific apparatus and process with a specific carrier gas, other apparatus and process and materials might be employed.

While the invention has been particularly shown and described with reference to preferred embodiments thereof, it will be understood by those skilled in the art that the foregoing and other changes in form and details may be made therein without departing from the spirit and scope of the invention.

We claim:

1. An infrared sensor device comprising a dielectric substrate;

a photoconductive infrared sensitive layer of polycrystalline mercury cadmium telluride on at least one surface of said substrate; and electrode means superposed on said infrared sensitive layer.

2. An infrared sensor device in accordance with claim 1 in which said substrate is sapphire and said electrode means comprises gold film deposited on selected areas of said infrared layer proximate a region of said infrared layer exposed to receive infrared radiation.

3. An infrared sensor device in accordance with claim 1 in which said substrate is quartz and said electrode means comprises gold film deposited on said infrared layer proximate a region of said infrared layer exposed to receive infrared radiation.

4. An infrared sensor device in accordance with claim 1 in which said substrate is glass.

* * * * *

UNITED STATES PATENT OFFICE
CERTIFICATE OF CORRECTION

Patent No. 3,779,803 Dated December 18, 1973

Inventor(s) Robert E. Lee, Philip S. McDermott and Edward S. Pan

It is certified that error appears in the above-identified patent and that said Letters Patent are hereby corrected as shown below:

Column 1, after the title "INFRARED SENSITIVE SEMICONDUCTOR DEVICE AND METHOD OF MANUFACTURE" insert the following paragraph:

--The invention herein described was made in the course of, or under a contract, or subcontract thereunder, with the Department of Defense.--

Column 1, line 7, "U. S. Pat. No. 3,619,282" should read --U. S. Pat. No. 3,642,529--.

Column 5, line 3, after "(Cadmium" insert --)--. Column 6, TABLE I, the "Mixing Furnace Temp. °C" for "CK55" should be --850--, not "950".

Signed and sealed this 1st day of October 1974.

(SEAL)
Attest:

McCOY M. GIBSON JR.
Attesting Officer

C. MARSHALL DANN
Commissioner of Patents